Oct. 25, 1966     R. C. MARTIN     3,281,268
SCALE REMOVAL
Filed Aug. 24, 1959
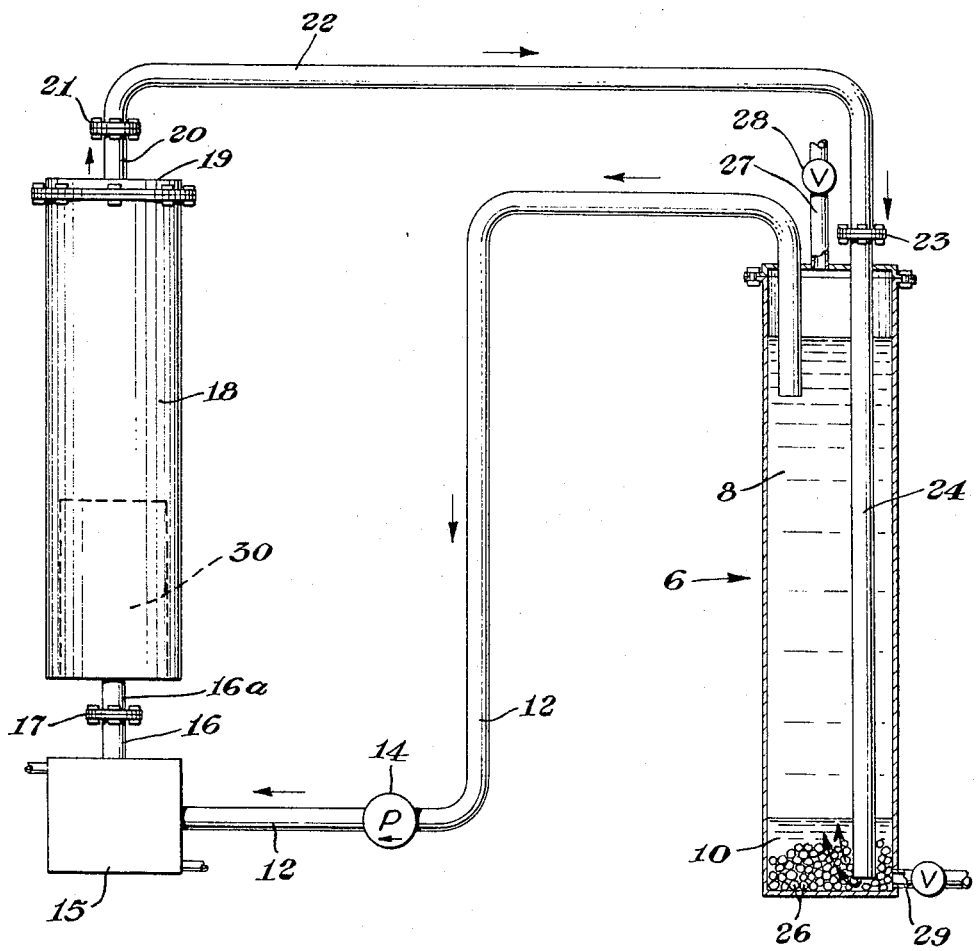
INVENTOR.
Robert C. Martin
BY
C.W.Catlin
ATTORNEY 3,281,268
SCALE REMOVAL
Robert C. Martin, Tulsa, Okla., assignor to The Dow Chemical Company, Midland, Mich., a corporation of Delaware
Filed Aug. 24, 1959, Ser. No. 835,783
12 Claims. (Cl. 134—10)

The invention relates to the removal of scale from metal surfaces and especially to the removal of scale comprising metal oxides and sulfides, by chemical action, from the interior of vessels employed for the use, transfer, or storage of fluids.

The formation of the scale on the interior surfaces of tubes, coils, tanks, transfer lines, heat exchangers, steam generating boilers, and other vessels used for confining fluids has been a source of trouble where such vessels are employed. The formation or deposition of scale markedly reduces the heat transfer through the walls of such vessels. Furthermore, the capacity of fluid-confining vessels and passage therethrough is restricted by the formation of such scale. The metal of which the vessel is made, due to the scale formation on the inner surfaces thereof, is subjected to excessive heat due to the loss in heat transfer. Greater pressures are required to overcome the restricted effect of the deposited scale. They often lead to leaks and ruptures which necessitate undesirable down-time and maintenance costs.

Numerous attempts have been made to remove scale containing metal oxides and sulfides from the interior of fluid-confining vessels. The more successful attempts have consisted of using aqueous solutions of known solvents for compounds commonly found in scale such as $Fe_2O_3$ and FeS. A widely used solution is a 1 to 25 percent aqueous HCl solution. Such aqueous solution usually contains an inhibitor to corrosive attack on metal.

Known solvents, however, have not proved fully satisfactory in a number of instances, due to their lack of effectiveness, excessive corrosiveness, or to other undesirable properties such as toxicity, unavailabiltiy, or cost. Furthermore, most known scale-removing compositions are aqueous and are, therefore, unsatisfactory for the removal of scale in systems into which the introduction of water is undesirable. It is also necessary when employing most known scale solvents to treat the surface subsequent to scale removal with a passivating composition to inhibit rust formation. A need therefore exists for an improved method of removing scale from interior surfaces of fluid-confining vessels.

The principal object of the invention is to provide such an improved method of scale removal. The manner of attainment of this and related objects will be made clear in the ensuing description and is specifically defined in the appended claims.

The invention is a method of removing scale from a metal surface which comprises treating such surface with a composition consisting of an alkyl acid phosphate preferably dissolved in an organic liquid medium, e.g., a liquid hydrocarbon such as a petroleum fraction, illustrative of which is kerosene. A particular embodiment of the invention is a process wherein the spent phosphate is regenerated by intermixing or passing it through an aqeuous HCl solution.

The surface thus treated according to the invention is effectively cleaned of metal-containing scale, e.g., oxides and sulfides of iron, copper, manganese, and aluminum and leaves a surface which is resistant to rust without the need for a passivating step. The treatment shows substantially no corrosive effect upon metal surfaces thus treated and does not require the presence of a corrosion inhibitor.

The alkyl acid phosphate employed according to the invention is oil-soluble and has one of the general formulae set out below:

$RH_2PO_4$
$R_2HPO_4$
$R_2H_2P_2O_7$ wherein R is an alkyl radical which contains at least 4 carbon atoms. R may represent the same or different alkyl radicals, the latter constituting what is known as a mixed ester. The alkyl acid phosphate to employ according to the invention, therefore, is a monoester, diester, or mixed ester of orthophosphoric or pyrophosphoric acid. Illustrative of specific esters of orthophosphoric acid and of pyrophosphoric acid to employ in the practice of the invention are the mono- or diesters of n-butyl, isoamyl, isooctyl, 2-ethylhexyl, decyl, lauryl, and tridecyl alcohols and mixtures thereof, and mixed orthophosphoric acid esters such as ethyl and lauryl, ethyl and oleyl, isoamyl and isooctyl, and isoamyl and 2-ethylhexyl. The monoesters, diesters, and the mixed esters of orthophosphoric and pyrophosphoric acids are readily available on the market. Illustrative of a monoester of orthophosphoric acid to employ in the practice of the invention having the formula set out below, hereinafter sometimes referred to as the dodecyl ester:

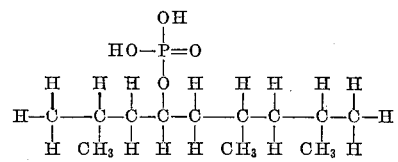

The alkyl acid phosphate may be employed in the practice of the invention in a 100 percent concentration. However, the preferred mode of practicing the invention is to dissolve the alkyl acid phosphate in an organic solvent since the solution thus prepared is less viscous, more easily circulated and of lower cost than 100 percent alkyl acid phosphate. A concentration as low as 0.05 percent by weight of the alkyl acid phosphate in the organic solvent is sufficient in some instances. The preferred concentration, however, is between 0.25 and 10.0 percent by weight. Among the organic solvents which may be used are alcohols, ethers, ketones, Diesel fuel, naphtha, gas oil, distillate, kerosene, higher boiling gasoline, toluene and carbontetrachloride. Mixed mono- and diesters of orthophosphoric are more commonly used than the more-or-less pure mono- or diesters thereof or the esters of pyrophosphoric acid.

In practicing the invention the alkyl acid phosphate, either undiluted, or dissolved in a suitable organic solvent, is brought into contact with a metal surface having an iron oxide or sulfide coating of scale to be removed therefrom. The temperature of the alkyl acid phosphate or organic solution thereof is not critical, although higher temperatures are preferred since the scale removal is faster at those temperatures. Any temperature above which the alkyl acid phosphate is fluid and below a temperature at which either the alkyl acid phosphate or the organic solvent is unstable may be employed. For example, petroleum fractions such as kerosene should not be employed above the flash point, which in the case of kerosene is about 140° F. The decomposition temperature of alkyl acid phosphates varies but may be considered to be about 600° F. The temperature usually employed is between about 100° F. and the flash point of the solvent employed. The period of time that the alkyl acid phosphate is maintained in contact with the scale to be removed varies dependent on a number of conditions among which are the thickness and character of the scale and composition, rate of circulation, and concentration of the alkyl acid phosphate employed. A period of from 1 or 2 to 25 or more hours but usually from 10 to 20 hours is employed.

In practicing the embodiment of the invention wherein the alkyl acid phosphate is regenerated by passing it through hydrochloric acid, the spent solvent containing dissolved iron scale is passed upwardly through the acid and/or is agitated therewith. The acid by thus contacting the solvent removes therefrom a substantial portion of the iron contained therein. The aqueous acid and the organic solvent stratify, the acid forming a lower stratum and the solvent forming an upper stratum. The upper organic stratum containing the alkyl acid phosphate may then be recycled back to the vessel being descaled and thus used over and over many times. The mode of operation permits the removal of a large amount of scale with a relatively small amount of solvent.

A 6–13 N hydrochloric acid is usually employed, about 10–12 N being preferred. Some means of agitating the organic solvent and the acid while in contact therewith for 10 to 30 minutes is preferred. In a continuous process having an agitator in the acid bath, an overflow line near the top of the organic stratum leading into a reservoir, from which the thus regenerated solvent is pumped for continued use, may be advantageously provided. However, merely returning the spent or "iron-loaded" solvent to the lower part of a body of acid, preferably a column thereof to provide greater height, allowing the organic solvent to pass upwardly through the acid to form a separate stratum above the acid, and pumping the thus regenerated solvent from the upper layer to the vessel being descaled, is satisfactory.

Any alkyl acid phosphate may be employed in the practice of the invention which is fluid. Those having the longer carbon chain groups are usually sufficiently diluted with an organic solvent to render them satisfactorily fluid. In the case of some of the longer alkyl groups, e.g., dodecyl, ethyllauryl, and ethyloleyl when used in 100 percent strength or when not sufficiently diluted, form gels upon contact with the scale. This condition is not objectionable and, in instances when a large surface is to be descaled by spraying the solvent thereon, the formation of a gel upon contact of the solvent with the scale is beneficial. The gel containing the scale is subsequently readily removed by spraying or washing the surface with an organic solvent, e.g., kerosene.

The iron content of the used acid may be periodically determined to ascertain the effectiveness of the descaling operation and the advisability of continuing further treatment. The iron content of the acid may be considered as being present largely in $FeCl_3$ and calculated as such. When the $FeCl_3$ present in the acid is low but yet does not increase appreciably with continued descaling treatment, further treatment for scale removal would be inadvisable. When the $FeCl_3$ present in the acid approaches the saturation point, the acid should be either discarded and replaced by fresh acid or be itself regenerated, as by adding a soluble hydroxide to precipitate the iron as $Fe(OH)_3$ and separating the precipitate by filtration. About 70 or 75 percent of the acid may be recovered for further use for regeneration in this way.

FIGURE 1 shows schematically an assembled apparatus useful in the practice of the invention wherein hydrochloric acid is employed to regenerate the solvent in a continuous process.

In the drawing, there is shown regeneration chamber 6, containing an upper stratum 8 of regenerated solvent and a lower stratum 10 of hydrochloric acid. Leading from a point below the surface of solvent 8 is pipe 12 through which solvent is forced by means of pump 14 through heater 15 and connecting nipples 16 and 16a (affixed to each other by flange assembly 17) into vessel 18 to be cleaned. Vessel 18 is provided with removable cover 19 having an opening therein to which is connected nipple 20, which, by means of flange assembly 21, is affixed to solvent return pipe 22. Pipe 22 is connected by means of flange assembly 23 to pipe 24 which carries spent solvent to a point below the interface of strata 8 and 10. Beads, lumps, or saddles of a material resistant to the action of the acid and solvent, e.g., porcelain or glass beads to provide better contact between the returning solvent and the acid, are represented by numeral 26. Stand pipe 27 at the top of chamber 6, equipped with valve 28, provides a convenient means for adding either additional solvent or acid when desired. Drain assembly 29 provides a means for drawing off spent acid and solvent when desired.

A metal piece requiring descaling is represented by numeral 30. It is shown in dotted outline as an alternative mode of practicing the invention when a non-confining article, section, or panel is to be descaled as contrasted to a vessel capable of being closed to permit the containment therein or passage therethrough of solvent. In such cases, vessel 18 serves as a treating vessel or chamber into which solvent is placed and the article to be cleaned submerged therein.

The drawing is only a schematic representation of modes of practicing the invention. It is to be understood that: the vessel to be cleaned or descaled may be any type of vessel including coils of steam generating, heat exchange, or refrigerating units, and that any metal assembly or part capable of being submerged in solvent contained in a treating vessel lends itself conveniently to being descaled according to the invention; that the acid regenerating feature of the invention is but an economically preferred embodiment thereof and the invention may be practiced by circulating unregenerated solvent; that a heater for the solvent is not necessary but is usually provided, especially in relatively large scale operations, because the use of a solvent at higher than atmospheric temperatures substantially lessens the time required for cleaning according to the invention; that the invention is applicable to a batch treatment employing, e.g., an open vat or tank into which metal articles to be descaled are dipped or submerged for the required period of time to be cleaned.

A series of tests was run to show the effect of different alkyl acid phosphates on mill scale-coated steel tube sections. Mill scale is considered to be largely $Fe_3O_4$. The sections were prepared by cutting a 2-inch diameter tube, having a wall thickness of 0.25 inch and composed of ASTM A209–517 steel, into 1-inch long pieces and quartering the pieces into substantially equi-sized segments having approximately a total of 23 square centimeters of mill-scaled area.

This series of tests was run as follows:

A 25 percent by weight hydrochloric acid solution was placed in chamber 6. Four times the volume of acid of a 10 percent by weight solution of the alkyl acid phosphate set out in Table I, in kerosene, was then placed in chamber 6, the solvent forming a stratum above the acid. One of the steel segment coupons, above described, designated 30 in the drawing, was placed in vessel 18. Heat was adjusted in heater 15 to maintain a temperature of solvent entering 18 at 120° F. Pump 14 was started and the alkyl acid phosphate in kerosene circulated as shown by the arrows on the drawing at a rate of one-half the total volume of solvent per minute for the time required to remove the mill scale. The alkyl acid phosphate employed and the time in hours required to remove completely the mill scale are set out in Table I.

The esters designated monoesters are commercially available forms which usually contain some diester as well. Similarly, those designated diesters usually contain some monoesters. The mixtures of mono- and diesters employed in the examples are substantially equimolar and ready commercially available. Their use in the examples is merely illustrative and other than equimolar ratios are included within the purview of the invention.

TABLE I

| Example No. | Alkyl Acid Orthophosphate Employed | Time Required to Remove Scale in Hours |
|---|---|---|
| 1 | Isooctyl monoester | 24 |
| 2 | Lauryl monoester | 19 |
| 3 | Dodecyl monoester | 96 |
| 4 | Mixture of about equimolar mono- and diisoamyl esters. | 42 |
| 5 | Mixture of about equimolar mono- and diisooctyl esters. | 10 |
| 6 | Mixture of about equimolar mono- and di-2-ethylhexyl esters. | 48 |
| 7 | Ethyl-lauryl diester | 42 |
| 8 | Isoamyl-isooctyl diester | 24 |
| 9 | Isoamyl-2-ethylhexyl diester | 48 |
| 10 | 1:1 weight ratio of (1) about an equimolar mixture of mono- and diesters of isooctyl admixed with (2) monolauryl ester. | 3.3 |
| 11 | 1:1 weight ratio of (1) about an equimolar mixture of mono- and diesters of isooctyl admixed with (2) about an equimolar mixture of mono- and diesters of di-2-ethylhexyl. | 2.5 |
| | Alkyl Acid Pyrophosphate Employed | |
| 12 | Isooctyl | 24 |
| 13 | 2-ethylhexyl | 48 |

An examination of the results set out in Table I shows that all the alkyl acid phosphates employed were effective to remove scale from the steel tube sections. Particularly effective were the compositions employed in Examples 10 and 11 which consisted, in Example 10, of a 1:1 weight ratio of (1) about an equimolar mixture of the mono- and diesters of orthophosphoric acid and isooctyl alcohol admixed with (2) the monolauayl ester thereof and, in Example 11, a 1:1 weight ratio of (1) about an equimolar mixture of the mono- and diesters of orthophosphoric acid and isooctyl achocol admixed with (2) about an equimolar mixture of the mono- and diesters of orthophosphoric acid and di-2-ethylhexyl alcohol.

Since Examples 10 and 11 embloyed equal parts by weight of the equimolar mixtures, they were repeated except that varing porportions of mixtures of the esters were employed. The proportions employed, in parts by weight, and the time required for complete removal of the scale are set out in Table II. The values obtained in Examples 10 and 11 are repeated for convenient comparison. Equimolar mixtures of the mono- and diesters were employed.

TABLE II

| Example No. | Alkyl Acid Orthophosphate Employed in Parts by Weight [1] | | Time in Hours Required to Remove All Scale |
|---|---|---|---|
| | A | B | |
| 10 | 1 | 1 | [2] 3.3 |
| 14 | 1 | 2 | 5.0 |
| 15 | 1 | 3 | 15.0 |
| 16 | 2 | 1 | 5.0 |
| 17 | 3 | 1 | 12.0 |
| | A | C | |
| 11 | 1 | 1 | [2] 2.5 |
| 18 | 1 | 2 | 4.0 |
| 19 | 1 | 3 | 28.0 |
| 20 | 2 | 1 | 6.0 |
| 21 | 3 | 1 | 21.0 |

[1] A—A mixture of about equimolar mono- and diesters of isooctyl acid orthophosphate. B—Monoester of lauryl acid orthophosphate. C—A mixture of about equimolar mono- and diesters of 2-ethylhexyl acid orthophosphate.
[2] Results of Examples 10 and 11, carried forward from Table I.

An examination of Table II shows that excellent cleaning of scaled metal surfaces was obtained employing varying weight ratios of the equimolar mixtures of mono- and diesters.

To show the effect of employing different amounts of alkyl acid phosphates in the practice of the invention, the examples set out below were run: a mixture consisting of equal parts by weight of (1) substantially equimolar mono- and diisooctyl acid orthophosphate and (2) substantially equimolar mono- and di-2-ethylhexyl acid orthophosphate was made and admixed with kerosene in the amounts shown in Table III below. The examples of Table III were run by placing a specimen of a segment of the quartered 2-inch diameter piece of tubing described hereinbefore, in the treating chamber represented by numeral 18 of an assembled apparatus similar to that shown in the drawing. The descaling solution thus prepared was maintained during these examples at 115° F. The time in hours required to remove the scale is also shown in Table III. Kerosene alone was run and is designeatd a blank.

TABLE III

| Example No. | Percent by Volume of the Alkyl Acid Orthophosphate in Kerosene | Time in Hours to Remove Scale |
|---|---|---|
| Blank | 0 | No removal in 24 hours. |
| 22 | 0.025 | Negligible removal in 24 hours. |
| 23 | 0.05 | 30. |
| 24 | 0.10 | 24. |
| 25 | 0.25 | 10. |
| 26 | 0.50 | 9. |
| 27 | 1.0 | 3.0. |
| 28 | 5.0 | 2.5. |
| 29 | 10.0 | 2.5. |
| 30 | 100.0 | 3.0. |

An examination of Table III shows that an amount as little as 0.05 percent by volume of the alkyl acid orthophospate in kerosene employed according to the invention was clearly effective to remove mill scale. It also shows that a concentration of from 1 to 100 percent was highly effective to remove the scale. It further shows that an amount greater than 5.0 percent did not increase the effectiveness of the alkyl acid orthophosphate employed.

To show the effect of different temperatures on the scale-removing properties of an alkyl acid phosphate dissolved in kerosene in acordance with the invention, the following examples were run: 0.5 percent of a mixture of substantially equimolar mono- and diisooctyl acid orthophosphate and 0.5 percent of a mixture of substantially equimolar mono- and di-2-ethylexyl acid orthophosphate were admixed in kerosene. Steel tubing sections similar to those in the above tests and containing 23 square centimeters of mill scale per section were placed in the treating chamber of an apparatus of the type shown in the drawing. The temperature was varried from 53° F to 140° F. Higher temperatures were not used because 140° F. is close to the flash point of kerosene. The length of time required to remove the scale together with the temperature employed are set out in Table IV which follows:

TABLE IV

| Example No. | Temperature in ° F. | Time in Hr. Required to Remove Scale |
|---|---|---|
| 31 | 53 | 9 |
| 32 | 75 | 3 |
| 33 | 100 | 3 |
| 34 | 120 | 3 |
| 35 | 140 | 3 |

By reference to Table IV it can be seen that there is an increased effectiveness in scale removal according to the practice of the invention when the temperatures employed are above 75° F. However, no increase in effectiveness was noted by increasing the temperature from 75° to 140° F.

Examples similar to those set out in the Tables above were run employing various weights of mixtures of equimolar mono- and di-alkyl acid orthophosphates both of the same alkyl derivative and of different alkyl derivatives in amounts up to 1 percent, dissolved in various organic solvents among which were No. 10SAE lubricating oil, diesel oil, denatured ethanol, and stoddard's solvent, a cleaning solution which is a petroleum distillate having a 50 percent maximum distillation temperature of 350° F. and a maximum end point temperature of 400° F. These solvents were all satisfactory for the practice of the invention.

Examples similar to the above examples were run wherein scales consisting largely of $Al_2O_3$, $MnO_2$, FeS, $FeS_2$, CuS, and $Cu_2S$ were subjected to the action of compositions in accordance with the invention. The method of the invention was effective to dissolve any of these scales. The action on the $Cu_2S$, CuS, and $MnO_2$ was observed to be somewhat slower than it was on the iron sulfides and oxides. The action on $Al_2O_3$ was particularly fast and effective.

Although the alkyl acid orthophosphate or acid pyrophosphate employed in the practice of the invention may be added directly to the organic solvents suggested without benefit of a wetting agent, it has been found more effective to employ from .05 to 1.0 percent of a surfactant effective in organic solvents, e.g., diethanol amide of coconut oil fatty acids, a nonionic surfactant, known as Alrosol. Coconut oil contains from 12 to 18 carbon atoms, 12 carbon atom acid predominating. The surfactant may be any of a wide number of wetting agents known. Although not essential to the practice of the invention, the surfactant increases the wetting properties of the solvent on the scale and hastens its action.

To illustrate further the practice of the invention, the following examples were run:

A 5 foot long A.I.S.I. 4140 carbon steel tube section, having an inside diameter of 2.5 inches, an outside diameter of 3 inches, and having mill scale (largely $Fe_3O_4$) deposit on the interior thereof as a result of the manufacturing process employed, was secured in the position shown by vessel 18 of the drawing. Ordinary glass marbles 26 were placed in the regenerating vessel 6 and a regenerating solution 19, consisting of 20 percent by weight hydrochloric acid was added to vessel 6. The descaling composition employed according to the invention consisted of a mixture of 0.5 percent of substantially equimolar mono- and diisooctyl acid orthophosphate and 0.5 percent of substantially equimolar mono- and di-2-ethylhexyl acid orthophosphate. The ratio of the amount of regenerating hydrochloric acid solution to the scale-removing solution was about 3 of the acid to 5 of the solvent by volume. Pump 14 was started and solvent circulated in the direction of the arrows shown on the drawing for 24 hours at a temperature of 120° F. during which the spent solvent was continuously regenerated by passing it through the hydrochloric acid solution. At the end of this period of time, pump 14 was stopped, the tube (vessel 18) removed, and the solvent drained therefrom. The thus treated tube was then cut open and the interior surface thereof examined and found to be substantially free from any mill scale, only a trace of scale being detectable at scattered points thereon. The surface was thereafter examined periodically and no evidence of after-rusting could be observed. The hydrochloric acid solution was thereafter analyzed and found to contain sufficient iron to show the removal of 7.1 grams of $Fe_3O_4$.

*Example 37*

Example 36 was repeated but there was admixed with the scale-dissolving solution, 0.05 percent of Alrosol surfactant. Examination of the tube at the end of the 24 hour period at 120° F. showed a complete removal of all mill scale.

A number of advantages are to be realized by the practice of the invention among which are: a method employing a highly effective non-aqueous solvent for the removal of scale from metal surfaces which leaves a clean surface which is not susceptible to after-rusting and requires no passivating treatment; a solvent which is readily regenerated by passing it through hydrochloric acid; the employment of materials which are readily obtainable at reasonable expense; there are no accompanying disadvantages such as excessive corrosivity or obnoxious fumes associated with the practice of the invention.

Having described the invention what is claimed and desired to be protected by Letters Patent is:

1. The method of cleaning pipes and the like to remove mill scale, rust and greasy deposits therefrom which consists in circulating therethrough and under pressure a solution of a hydrocarbon and a phosphoric acid ester whereby said hydrocarbon emulsifies the greasy deposits and the phosphoric acid ester reacts with the mill scale and rust to form iron oxide and subsequently subjecting said solution to hydrochloric acid whereby said phosphoric acid ester is reconstituted by the hydrochloric acid forming the salt of the hydrochloric acid and restoring the hydrogen in the acid radical of the phosphoric acid ester.

2. The method set forth in claim 1 and wherein the hydrocarbon comprises kerosene and the phosphoric acid ester comprises mono di iso-octyl acid orthophosphate.

3. The method of removing scale from a metal surface consisting essentially of contacting such scale with an organic solvent solution of an alkyl acid orthosphosphate selected from the class consisting of freely oil-soluble and water-insoluble monoalkyl acid esters, dialkyl acid esters, and mixtures thereof, of orthophosphoric acid, said alkyl group containing at least 8 carbon atoms.

4. The method of claim 3 wherein a mixture of the monoesters and diesters of orthophosphoric acid are employed in the organic solvent in an amount between 0.05 and 10 percent by volume of the organic solvent.

5. The method of claim 4 wherein between 0.1 and 1.0 percent by weight of a surfactant soluble in the organic solvent, based on the weight of the solvent, is admixed with the organic solvent.

6. The method of claim 4 wherein the organic solvent is kerosene.

7. The method according to claim 3 wherein the alkyl acid phosphate is regenerated by passing the spent alkyl acid phosphate from the descaling operation through a mineral acid to regenerate the alkyl acid phosphate.

8. The method of claim 7 wherein the mineral acid is hydrochloric acid.

9. The method of claim 8 wherein the concentration of the acid is between 6 and 13 normal.

10. The method of removing scale from a metal surface consisting essentially of contacting such scale with a mixture of monoesters and diesters of orthophosphoric acid consisting essentially of a mixture of (1) monoisooctyl and diisooctyl orthophosphates and (2) mono-2-ethylhexyl and di-2-ethylhexyl acid orthophosphates, in an organic solvent, said mixture of esters being employed in an amount of between about 0.05 and 10.0 percent by volume of the organic solvent.

11. The method of claim 10 wherein the mixture consists by weight of between 1 and 3 parts of the mixture of monoisooctyl and diisooctyl acid orthophosphate and between 3 and 1 parts of the mixture of mono-2-ethylhexyl and di-2-ethylhexyl acid orthophosphate.

12. The method of claim 11 wherein the mixture of monoisooctyl and diisooctyl acid orthophosphate is substantially equimolar and the mixture of mono-2-ethylhexyl and di-2-ethylhexyl acid orthophosphate is substantially equimolar.

(References on following page)

References Cited by the Examiner

UNITED STATES PATENTS

| | | | |
|---|---|---|---|
| 2,005,619 | 6/1935 | Witt | 252—89 |
| 2,032,174 | 2/1936 | Johnson | 137—40 |
| 2,036,848 | 4/1936 | Amthor et al. | 137—90 |
| 2,084,361 | 6/1937 | Vanderbilt | 252—136 |
| 2,224,695 | 12/1940 | Prutton | 148—6.15 |
| 2,651,829 | 9/1953 | Nusslein | 252—89 |
| 2,789,070 | 4/1957 | Copelin | 148—6.15 |
| 2,852,471 | 9/1958 | Atkins | 252—171 |
| 3,010,853 | 11/1961 | Elliott | 134—22 X |

FOREIGN PATENTS 46,846   6/1936   France.

OTHER REFERENCES

"Chemical Industries" October 1942 pp. 516–521 and 557 relied on.

MORRIS O. WOLK, *Primary Examiner.*

SIDNEY JAMES, CHARLES A. WILLMUTH, P. McLENDON, J. ZATARGA, *Assistant Examiners.*